United States Patent [19]
Moon

[11] Patent Number: 4,855,658
[45] Date of Patent: Aug. 8, 1989

[54] DEAD TIME COMPENSATED CONTROL LOOP

[75] Inventor: Sang F. Moon, San Jose, Calif.

[73] Assignee: Measurex Corporation, Cupertino, Calif.

[21] Appl. No.: 172,071

[22] Filed: Mar. 23, 1988

[51] Int. Cl.$^4$ .......................................... G05D 23/19
[52] U.S. Cl. .................................. 318/632; 318/561; 364/469
[58] Field of Search ................ 318/561, 632; 364/468, 364/469, 470, 471, 472, 473

[56] References Cited

U.S. PATENT DOCUMENTS

| | | | |
|---|---|---|---|
| 4,009,113 | 7/1978 | Hayashi | 318/632 |
| 4,052,642 | 10/1977 | Speth et al. | 318/632 X |
| 4,296,365 | 10/1981 | Yoshikawa | 318/632 |
| 4,385,685 | 5/1983 | Sticht | 318/468 X |
| 4,398,254 | 8/1983 | Kondo et al. | 364/472 |
| 4,543,517 | 9/1985 | Poppelreiter et al. | 318/561 X |
| 4,742,285 | 5/1988 | Sasaki et al. | 318/632 |
| 4,750,104 | 6/1988 | Kumamoto et al. | 318/632 X |

Primary Examiner—Benjamin Dobeck
Attorney, Agent, or Firm—Spensley Horn Jubas & Lubitz

[57] ABSTRACT

A system and method are disclosed for determining process dead time and for controlling a process using a dead time compensated control loop. The dead time is determined from a cross-correlation function of a perturbing signal applied to a processing station and the output of a sensor which detects physical characteristics of the product controlled by the processing station affected by the perturbing signal.

19 Claims, 2 Drawing Sheets

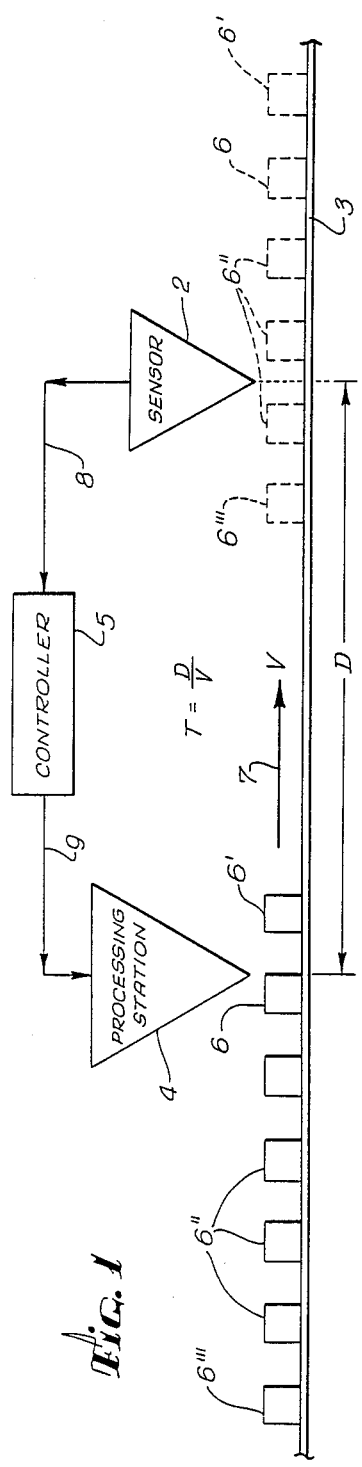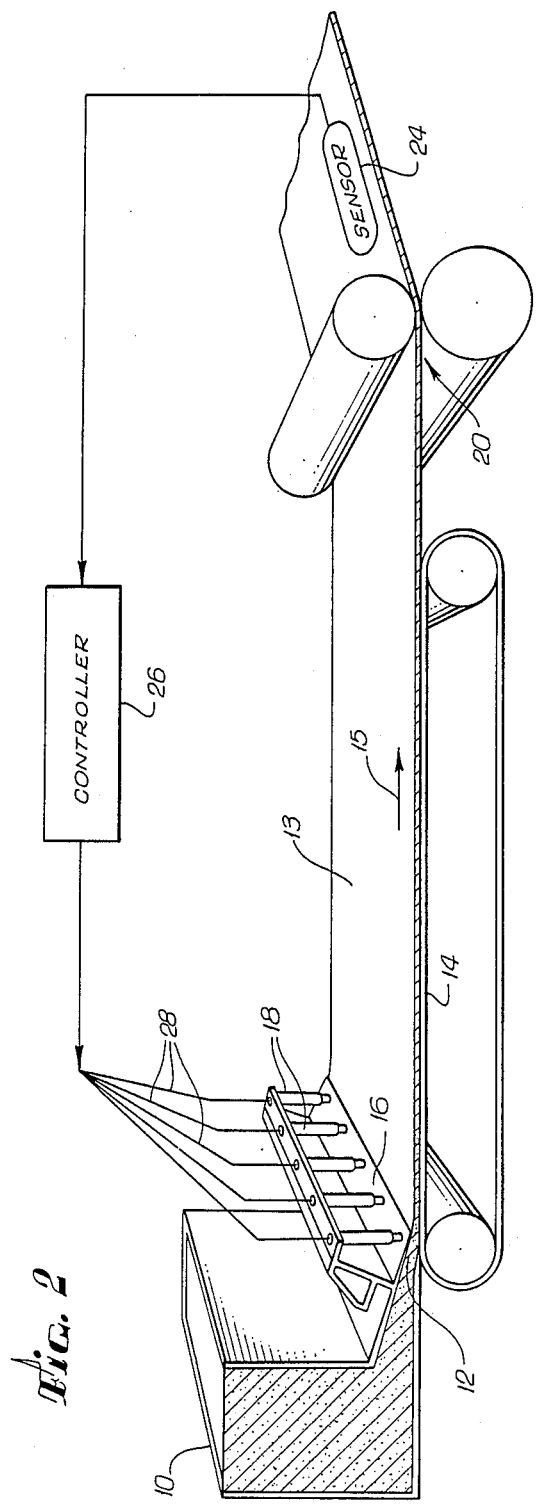

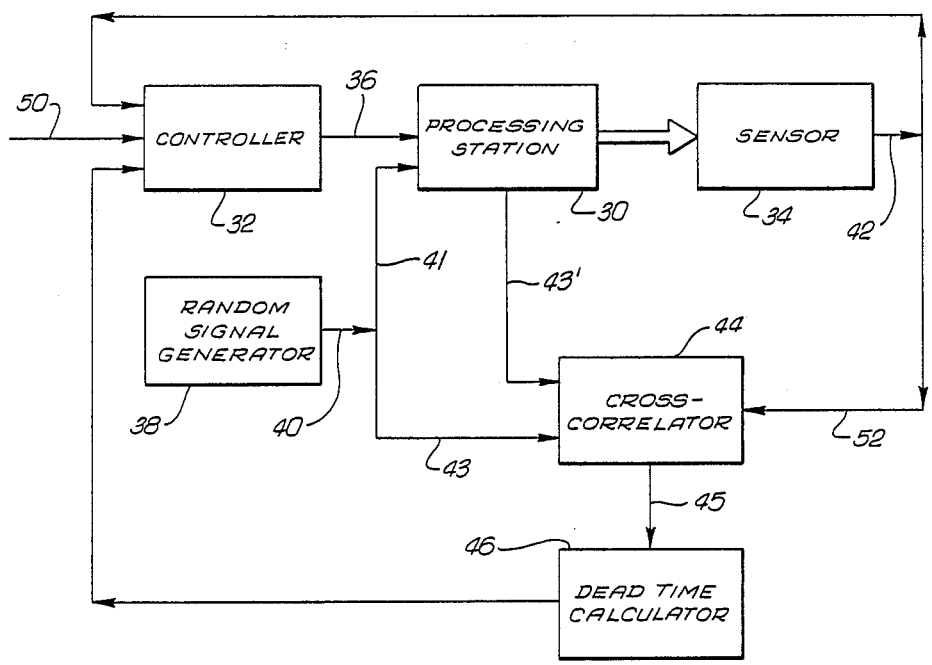
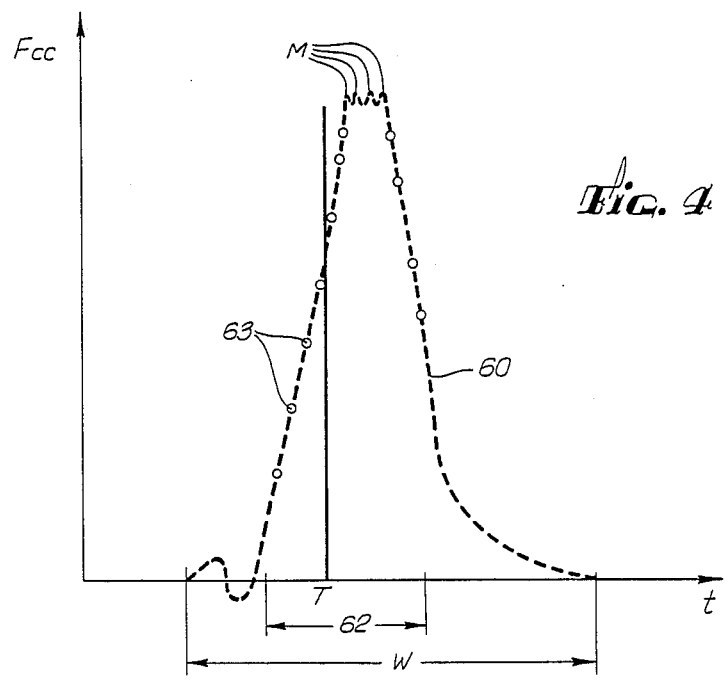

DEAD TIME COMPENSATED CONTROL LOOP

BACKGROUND OF THE INVENTION

The present invention relates to a system and method for determining the time interval ("dead time") between adjustment of a parameter in a process and detection of the effect of such adjustment on the product of the process. The present invention also relates to control of a process using a dead time compensated control loop.

In a typical manufacturing process, there may be a number of actuators at a particular processing station which can be utilized to vary process parameters, such as temperature, pressure, flow rate, etc., to thereby effect changes in the process. In addition, in some processes, there are also a number of sensors which are used to detect the effects of varying the process parameters on the resulting product. Some of these processes make use of feed-back signals from the sensors to control the actuators and thereby control the manufacturing process in accordance with particular process specifications.

FIG. 1 shows a schematic arrangement of a simple product manufacturing process. In the process, a particular product 6 is being processed by a processing station 4. The product is carried by a conveyor belt 3 in a direction indicated by arrow 7 to a sensor 2. The sensor 2 determines if the processing station 4 has processed the product 6 in a manner meeting a desired specification, e.g., a target weight or dimension. The sensor 2 transmits feedback signals, corresponding to the sensed characteristic of the product 6, along line 8 to a controller 5. If the controller 5 determines that the product 6 does not meet the desired specification, it outputs a control signal along line 9, to the processing station 4 so as to adjust one or more parameters such that products subsequently processed by the processing station 4 will meet the desired specification.

It can be seen from FIG. 1 that there is a time interval, T, between the change in parameter at the processing station 4 and the detection of such change by the sensor 2. The interval T is present due to the physical characteristics of the system, i.e. in this example, the speed V of the conveyor belt 3 and the distance D between the processing station 4 and the sensor 2 (T=D/V). This interval T represents the time between when the processing station 4 has processed the product 6 and when the sensor 2 can detect the effects of the processing station 4 on the product. This time interval T is often referred to as "dead time". The term "dead" is used instead of "delay" to describe the time interval T because the interval T is neither a delay in the response of the sensor 2 nor a delay in the response time of the processing station 4 or controller 5. Rather, the dead time interval T is a waiting period during which the particular product 6 cannot be sensed by the sensor 2 during the movement of the product 6 from the processing station 4 to the sensor 2.

It has been found that for certain applications it is critical to be able to accurately determine the dead time T. In the process shown in FIG. 1, for example, assume that the controller 5 effects a change in the processing parameters of the processing station 4 at the time that the product 6 is under the station 4. If the controller 5 reacts to signals from the sensor 2 after a time interval less than the actual dead time T since the change in the process parameter, then the process will be over-corrected. This is because the feed-back signal from the sensor 2 would not correspond to the product 6 which was actually processed by the processing station 4 during the change in the process parameter. Instead, the sensor would have detected a different product 6' which is in front of the product 6 on the conveyor belt 3. Product 6' was, however, not affected by the change in the process parameter and therefore does not correspond to the current state of the process at the instant the sensor 2 detects product 6'. As a result, the feed-back signal from the sensor 2 will erroneously indicate to the controller 5 that further corrections of the process parameter are required in order to make the subsequent products meet the desired specification. Consequently, an additional, and possibly unnecessary correction of the process parameter is triggered by the controller 5, which will thus over-correct the process. Such over-correction may result in oscillations in the control process.

On the other hand, if the controller 5 reacts to the feed-back signal from the sensor 2 at a time interval which is longer than the actual dead time T since the preceding change in the process parameter, the controller 5 would thus control the processing station based upon sensor feed-back signals which correspond to the physical characteristics of a product 6''' that was processed by the processing station long after product 6 had been processed. As a result, an unnecessarily large number of products 6'' may have passed from the processing station 4 to the sensor without the controller 5 making corrections to the processing characteristics of the processing station 4. In the interim, the process parameter affected by the processing station 4 may have drifted out of the specification limits.

Referring to FIG. 2, a previously known method of determining dead time in a paper manufacturing process will now be described. In particular, FIG. 2 illustrates a system in a papermaking process for controlling the mass per unit area ("basis weight") of a sheet of paper 13. Typically, in a papermaking process, a slurry of wood fibers and water is fed into a tank called a "headbox" 10, and the slurry then flows continuously through an opening 12 defined by the slice lip 16. The slurry is deposited onto a continuous conveyor belt 14. The conveyor belt 14 moves in a direction away from the headbox 10 as shown by arrow 15. The slurry thus forms a continuous sheet 13 on the conveyor belt 14. The sheet of paper slurry 13 drains some of its water content as it is being transported by the conveyor belt 14, and thereafter the sheet 13 is pressed by rollers 20 to remove additional moisture from the sheet 13. The basis weight of the sheet 13 is then measured using the basis weight sensor 24.

The vertical position of the slice lip 16 is related to the size of the opening 12 and hence to the amount of slurry deposited on the conveyor belt and ultimately to the basis weight of the sheet 13. The vertical position of the slice lip 16 is controlled by a plurality of actuators 18 which are connected to the slice lip 16 and to the headbox 10. Information from the sensor 24 is transmitted to a controller 26 which in turn controls the actuators 18 to obtain the desired basis weight of the sheet 13.

A previously known method of determining the dead time with respect to the slice lip 16 and the sensor 24 includes the steps of manually perturbing the control of the actuators 18 and determining the elapsed time from such a single perturbation before the effect of the perturbation on the basis weight can be detected by the sensor 24. Specifically, the perturbation effects a sudden change in width of the opening 12 from its nominal width, thereby changing the basis weight of the sheet 13. The local change in basis weight serves as a marker to be detected by the sensor 24 after dead time T. The magnitude of the perturbation is set to be substantially larger than the magnitude of the noise in the control signals 28 from the controller 26 to ensure that the sensor 24 is able to distinguish the marker, which is caused by the manual perturbation, from the variations in basis weight caused by noise in the control signals 28.

The above described method of determining dead time has a number of shortcomings. Firstly, the method requires a relatively large local change in basis weight from the steady state basis weight to ensure that the marker can be clearly distinguished from the variations in basis weight caused by noise in the control signals. As a result, considerable time may be required after the change for the process to regain a steady state.

Secondly, the above described method destroys the uniformity of the finished product. The presence of the marker sets the upper limit on the length of sheet that can be produced of uniform basis weight. Moreover, when the sheet is cut to size for conversion into finished paper products, the local basis weight variation may be located in the middle of a cut portion. Such portion has to be discarded, thus leading to waste. Also, additional inspection steps are required to identify such marked portion in the finished product.

Another method previously used to determine dead time involves determining the speed of the sheet 13 by simply determining the speed of the rollers 20. However, the dead time determined by this method is not reliable. This is because there may be slippage between the rollers 20 and the paper sheet 13, which slippage may vary with time. In addition, the sheet 13 changes length as it is stretched and/or pressed by the rollers 20. The speed of the rollers 20 thus does not directly correspond to the speed of the sheet 13. Consequently, dead time cannot be accurately determined by this method.

SUMMARY OF THE INVENTION

The present invention is directed to a system and method for automatically determining process dead time with respect to a processing station and a sensor in a process, with minimal disturbance to the overall process. A small amplitude perturbation signal is introduced to the control of the processing station. One or more of the physical characteristics of the product which are disturbed by the perturbation signal are monitored by a sensor to detect the changes to the product made by the processing station. The sensor output signal and the perturbation signal are then cross-correlated to identify the portion of the sensor output signal that corresponds to the change in the product effected by the perturbation in the control signal. The process dead time is determined to be the relative time shift between the cross-correlated signals which causes the cross-correlation function to reach a maximum value. Because of the ability of the cross-correlation technique to detect very small perturbations in the physical characteristics of the product, the dead time can be determined without altering the physical characteristics of the product to the extent that it is outside the desired specification limits, and therefore possibly unusable. Methods and devices for cross-correlating two signals are known.

The system of the present invention may comprise a random signal generator for transmitting a short burst of a signal having a randomly varying amplitude along the control line of the processing station to perturb the process parameter being controlled. The random signal has a small amplitude compared to the typical process control signal for the particular process parameter, so that the effect of the perturbation on the process is kept to a minimum. The process parameter is varied as a result of the random signal and a sensor downstream of the processing station senses the effect of the random signal on the product. In response, the sensor produces an output representative of such effect. The sensor output is fed directly to a cross-correlation device. At the time the random signal is applied to the processing station, it is also fed to the cross-correlation device. The cross-correlation device may be an appropriately programmed digital computer, or an analog cross-correlating circuit. Cross-correlation computer programs and circuits are known. The cross-correlation device cross-correlates the sensor output signal with the random signal from the random signal generator to form a cross-correlation function. The process dead time with respect to the instant the functioning of the processing station is perturbed by the random signal and the instant the sensor can first sense the effect of the perturbation is determined by calculating the relative time shift between the two cross-correlated signals which produces the maximum value of the cross-correlation function.

The calculated dead time is fed to a process controller which also directly receives a feed-back signal from the sensor. In response to the sensor feed-back signal produced at the instant after a dead time interval has elapsed since the preceding change in the control signal, the controller determines any further corrections that may need to be made to the process parameter so as to operate the process according to the desired specification. The controller then provides a control signal to the processing station to vary the process parameter accordingly.

According to the present invention, it is only necessary to perturb the output signal of the controller briefly and with an amplitude which is comparable to that of the noise present in the control signal. In accordance with the known properties of a cross-correlation function, the small amplitude perturbation can be clearly distinguished from the noise by the cross-correlation technique. The noise in the control signal contributes substantially zero value to the cross-correlation function.

Circuit delay, such as the delay in transmitting the random signal from the random signal generator to the processing station or to the cross-correlator is negligible in an analog system or in a centralized digital system when compared to the delay in transporting the product from the processing station to the sensor. Thus, circuit delay can usually be ignored in the dead time calculations of these systems.

In a distributed digital computer system, however, due to circuit delay (i.e. communications delay) between the computers (e.g. the computerized random signal generator, the computer controlled processing station, and the computerized sensor signal processor), the circuit delay sometimes becomes significant and this delay, therefore, has to be accurately determined to generate a cross-correlation function. Furthermore, due to the nature of a digital computer controlled system wherein certain computations may take a longer time to complete than others and/or run at higher priorities, the circuit delay becomes variable. In a cross-correlation function computation, if such a randomly varying time delay is introduced between the transmitted signal and its response signal from the sensor, the calculated cross-correlation function does not truly reflect the cross-correlation relationship between these two signals. For this reason, the circuit delay in a distributed computer system must be accurately calculated to get a useful cross-correlation function.

Also, in certain processes, the dead time may vary over time and with changes in process parameters. In these situations, it may, therefore, be necessary to periodically recompute the dead time during processing. To accomplish this, the random signal generator may be set to periodically emit a low amplitude random signal to briefly perturb the control of the processing station. The process dead time is then recomputed with each new random signal in the manner previously discussed. The controller is then reset to control the processing station based upon output signals from the sensor taking into account a period corresponding to the newly recomputed dead time.

BRIEF DESCRIPTION OF THE DRAWINGS

FIG. 1 is a schematic diagram illustrating a cause of process dead time in a manufacturing process.

FIG. 2 is a schematic diagram illustrating basis weight control in a paper manufacturing process.

FIG. 3 is a block diagram of an embodiment of a dead time compensated control system of the present invention.

FIG. 4 illustrates cross-correlation functions obtained under ideal (solid line) and non-ideal (dashed line) conditions.

DETAILED DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

FIG. 3 shows the block diagram of one embodiment of a system of the present invention for determining the process dead time of a given process and for controlling the process with a dead time compensated controller 32. In the process, a processing station 30, such as one for regulating the basis weight of paper in a paper manufacturing process previously described, is controlled by the controller 32. A sensor 34 is provided to detect the effect of the processing station 30 on the process parameters, such as basis weight.

A cross-correlation scheme is employed to determine the process dead time, i.e., the time between the change in process parameters effected by the processing station 30 and the detection of such change by the sensor 34. Specifically, a short burst of a small amplitude perturbation signal is transmitted along line 41 to the processing station 30. The perturbation signal is provided by, preferably, a pseudo-binary random sequence signal generator 38. The random signal 40 is applied directly to the processing station 30. The random signal 40 causes the processing station 30 to effect a small random change in the process parameter controlled by that station 30.

The sensor 34 first detects the effects of the random perturbation of the process parameter on the product of the process at the time T after the random signal 40 has been received by the processing station 30. This time T is the dead time representing the interval between the application of the perturbation signal to the processing station 30 and the first instant the effect of the perturbation on the product of the process can be detected by the sensor 34. The sensor output 42 is transmitted to the cross-correlator 44 along line 52. The random signal 40 from the random signal generator 38 is also transmitted to the cross-correlator 44 along line 43. The portion of the sensor output signal 42 corresponding to the effects on the product of the random signal 40, and the random signal 40 direct from the random signal generator 38, are received by the cross-correlator and time shifted relative to each other by varying amounts. In this embodiment, the cross-correlator is an appropriately programmed digital computer. The time shifted signals are then multiplied together by the cross-correlating computer 44 to yield a cross-correlation function.

In a distributed digital computer system, the random signal after it is received by the processing station 30 with a certain amount of communication delay is transmitted back to the cross-correlator 44 along line 43'. This signal from line 43' is compared in the cross-correlator with the signal from line 43 received directly from the random signal generator 38, and the communication delay is calculated by comparing these two signals. This calculated communication delay time is used in the calculation of the cross-correlation function to compensate for any randomness in the communication delay.

The application of cross-correlation techniques to identify a time shifted signal is known. It is therefore sufficient to briefly summarize the application of the cross-correlation technique in connection with the present invention. The correlation between waveforms of two signals is a measure of the similarity or "relatedness" of the waveforms. For a random signal 40 having a particular random waveform, the cross-correlation function between the random signal 40 and the sensor output 42 is defined as:

$$F_{cc}(T) = \lim_{I_o \to \infty} \frac{1}{I_o} \int_{-\frac{I_o}{2}}^{\frac{I_o}{2}} f_1(t) f_2(t + T) \, dt$$

where
  $F_{cc}(t)$ is the cross-correlation function; $f_1(t)$ is the waveform of the random signal 40 at times t;
  $f_2(t+T)$ is the waveform of the sensor output 42 at times $t+T$;
  T is the time shift between the random signal 40 and the sensor output 42; and
  $I_o$ is the integration interval.

FIG. 4 illustrates a graphical plot of a typical cross-correlation function between a random signal and its response signal (e.g. the sensor output 42). The solid and dotted lines are plots of the cross-correlation functions obtained under ideal and non-ideal conditions, respectively. As shown by the solid line plot, ideally, the cross-correlation function between a random signal and its ideal response has a zero value, until the process dead time T. At T the cross correlation function rises instantaneously to its maximum value and then it drops exponentially to zero. The maximum value and the rate of the exponential drop depend on the characteristic of the processing station 30 and the sensor 34.

Under non-ideal conditions, the cross-correlation function does not rise sharply to its maximum value at the dead time T, but gradually increases to a large value near the dead time T. Moreover, the non-ideal cross-correlation function may have several maxima M, as illustrated by the dashed line plot.

The non-ideal cross-correlation function developed by the cross-correlator 44 is applied to a dead time calculator 46 for determining the time shift, T, between the sensor output 42 and the random signal 40 which corresponds to the steepest change in the non-ideal cross-correlation function within the neighborhood of the peak of the cross-correlation function. This time shift, T, corresponding to the steepest change in the correlation function, represents the process dead time.

The portion of the sensor output 42 that is not related to the random signal, i.e. the portion of the sensor output 42 in response to the normal control signals along line 36, is said to be "non-coherent" with the random signal and therefore the correlation function is substantially zero with respect to the random signal 40. Similarly, any noise in the process and sensor measurement is also unrelated to or "non-coherent" with the random signal and, therefore, the noise in the process and sensor measurement also has substantially zero contribution to the value of the cross-correlation function. The above analysis is in accordance with the known averaging properties of cross-correlation functions.

An advantage of using the cross-correlation technique to determine dead time is that the amplitude of the perturbing random signal can be substantially smaller than the amplitude of the signals used in the prior art techniques. Also, the frequency of the perturbing signal for the cross-correlation technique is much higher than that of other prior art techniques. Therefore, the effect of the random disturbance on the product is almost negligible, while still allowing the effect on the process made by the random signal to be clearly identified from the sensor output. In accordance with the properties of cross-correlation functions, by cross-correlating the sensor output with the random signal, the small, high frequency perturbation of the processing station 30 effected by the random signal 40 can be accurately identified from the sensor output 42, without requiring the large amplitude, low frequency signals necessitated by the prior art techniques. Because the amplitude of the random signal is small and at a relatively high frequency, the process parameter is not substantially changed by the random signal which would otherwise affect the desired overall control of the process. The minimal variation in the process parameter as a result of the small amplitude, high frequency perturbation should be acceptable for applications such as controlling paper basis weight in a papermaking process.

As previously mentioned, under non-ideal conditions, the peak of the cross-correlation function, $F_{cc}(t)$, may have a number of maxima, M. In this situation, instead of arbitrarily designating the dead time, T, as corresponding to the relative time shift, t, at one of the several maximum values of the cross-correlation function, the dead time may alternatively and more accurately be determined to be the value of t that corresponds to the maximum rate of increase in value of the cross-correlation function, $F_{cc}(t)$. Referring to FIG. 4, the dashed line illustrates an exemplary plot of a cross-correlation function obtained under non-ideal conditions as compared to the plot represented by the solid line for ideal conditions. It has been found that the time corresponding to the maximum slope of the cross-correlation function is a very good approximation of the actual dead time.

The slope of the cross-correlation function, $F_{cc}(t)$, can be determined by first locating the general location, W, of the peak of the cross-correlation function. Computer algorithms for performing this function are well known. The slope of the function is then determined at a predetermined number of sample points 63 in the neighborhood of the peak of the cross-correlation function. The time t that corresponds to the maximum positive slope is substantially equal to the correct dead time T.

To streamline the sampling process, a sampling window 62 of a predetermined width is defined and roughly centered about the peak. This window 62 defines the boundaries for sampling the function. The size of the window 62 is chosen to be such that it will exclude portions of the function having slopes which are expected to be small. The window 62 thus reduces the number of sampling points required.

The determined process dead time may be applied to the process controller 32 to compensate its control function for the delay in transporting the products from the processing station 30 to the sensor 34. The controller 32 compares the sensor output signal 42 to a reference signal 50 which corresponds to the desired process specification to determine whether further adjustment of the process parameter is necessary to correct the process. If there is a difference in these two signals, a correction is made. Specifically, the controller 32 issues a control signal 36 dependent upon the difference between the sensor feed-back signal 42 and the reference signal 50. With dead time compensation, the controller 32 will not, however, issue the control signal to change the process parameter subsequent to the issuance of the preceding control signal change unless an interval corresponding to the process dead time T has elapsed. Otherwise, the controller 32 will be reacting to sensor outputs which do not correspond to the results of the preceding change in the control signal. For example, as previously mentioned, at a time less than the dead time T, the sensor 34 would not have detected the change to the process effected by the last change in the process parameter. This would cause the controller 32 to issue a control signal to further correct the process. As a result, the process would be over-corrected.

The normal control function of controller 32 is preferably, but not necessarily, suspended while the dead time is determined. During suspension of controller operation, the processing station parameters are held at the values obtained immediately prior to the suspension of controller operation. Suspending the operation of the controller 32 while the dead time is being determined prevents unwanted feedback. That is, it prevents the controller from changing the processing effected by the processing station based upon sensor signals resulting from the product which was manufactured by the processing station during application of the random signal.

As previously mentioned, in certain manufacturing situations, the dead time may not remain constant, but instead varies with time. In these situations, the random signal generator 38 can be made so that it transmits a random signal at certain intervals. Each time a random signal is transmitted, the cross-correlator cross-correlates the random signal from the random signal generator 38 with the output signal 42 from the sensor 34, and the dead time calculator 45 utilizes the resulting cross-correlation function to recompute the dead time. The recomputed dead time is then transmitted to the controller 32 which accounts for the new dead time value in its future control functions in the manner previously described.

What has been described is a system and method for determining process dead time by employing a cross-correlation scheme. The determined process dead time is utilized to control the response of the process controller to the sensor signals in a dead time compensated control loop. The invention has been disclosed with reference to the previously described embodiments, and is particularly useful in controlling the basis weight of a paper sheet in the manner discussed in connection with FIG. 2. Nevertheless, it will be understood that various modifications may be made without departing from the spirit and scope of the invention. For example, the invention is applicable to sheet material other than paper, as well as to processes involving fluids and gases. Also, a pseudo-binary random sequence signal is usually preferred since its average contribution to changes in the physical characteristics of the resulting product will be zero. Another advantage of using a pseudo-binary random signal is that it is easy to generate and it substantially simplifies the calculation of the cross-correlation function. Accordingly, the use of a random signal facilitates the determination of the dead time. Nevertheless, random signals other than a pseudo-binary random signal may also be used in the present invention to achieve the same results, provided its power spectrum is flat (i.e. white). Accordingly, it is to be understood that the invention is not to be limited by the specific illustrated embodiment, but only by the scope of the appended claims.

I claim:

1. A system for determining the dead time interval between an adjustment of a process parameter in a process and the time when the effect of the adjustment on the process can be detected by a sensor, comprising:
   processing means for processing a material according to a process parameter;
   perturbation means for producing a perturbation signal and applying said signal to the processing means to perturb the process parameter in accordance with the perturbation signal;
   a sensor, spaced from the processing means, for sensing a physical characteristic of the product made by the process, including the characteristic effected by the perturbation signal and producing a sensor signal in response thereto;
   cross-correlation means for cross-correlating the perturbation signal which was applied to the processing means and the signal produced by the sensor, and for producing a cross-correlation function therefrom;
   dead time determination means, utilizing the cross-correlation function, for calculating the dead time interval between the time when the perturbation signal is applied to the processing means and the time that the sensor senses the effect of the perturbation on the product.

2. A system as defined in claim 1, further including control means for receiving the sensor signal and providing a control signal to the processing means in response to the sensor signal to effect changes in the processing of the processing means; and
   means for determining when the changes in processing occur based upon the dead time calculated by the dead time determination means.

3. A system as defined in claim 2, wherein the dead time interval is determined based upon on the location of the maximum value of the cross-correlation function.

4. A system as defined in claim 2, wherein the dead time interval is determined based upon the location of the maximum rate of increase in value of the cross-correlation function.

5. A system as defined in claim 2, wherein the perturbation means produces the perturbation signal periodically, and the dead time determination means recalculates the dead time from each periodically produced perturbation signal.

6. A system as defined in claim 5, wherein the perturbation signal is a pseudo-binary random signal of a small amplitude and predetermined duration.

7. A system as defined in claim 2, wherein the control signal is suspended while the perturbation means produces the perturbation signal.

8. A system as defined in claim 2, wherein the process is a papermaking process, the process parameter is basis weight, and wherein the processing means includes means for controlling the basis weight.

9. A method for determining the dead time of a system between the change of a process parameter and the time when the effect of the change is sensed by a sensor, comprising the steps of:
   at a first location, utilizing a first signal to change the process parameter;
   transporting the product resulting from the changed process parameter to a second location;
   at the second location, sensing the physical characteristic of the product affected by the changed process parameter, and producing a second signal in response thereto;
   cross-correlating the first and second signals to produce a cross-correlation function; and
   utilizing the cross-correlation function to compute the dead time of the system.

10. The method of claim 9, further comprising the step of using a third signal to change the process parameter in response to the second signal at a time determined by the computed dead time.

11. The method of claim 10, wherein the first signal is a low amplitude random signal.

12. The method of claim 10, wherein the dead time is recomputed periodically.

13. A method, for controlling a process, comprising the steps of:
   at a first location, utilizing a first signal to make a change in a physical characteristic of a product being produced by the process;
   transporting the product having the changed physical characteristic to a second location spaced from the first location;
   sensing the physical characteristic at the second location, and producing a second signal in response thereto;
   cross-correlating the first and second signals to produce a cross-correlation function;
   utilizing the cross-correlation function to compute the dead time of the process;
   making a relatively large change in the physical characteristic based upon the second signal at a time determined by the computed dead time.

14. A method as in claim 13, wherein the first signal is a low amplitude random signal.

15. A system as defined in claim 8, wherein the sensor is a paper sheet basis weight sensor.

16. A system as defined in claim 15, wherein the perturbation means is a pseudo-binary random signal generator.

17. The method of claim 10, wherein the system is a papermaking system, the process is a papermaking process, and the process parameter is paper sheet basis weight.

18. A method as in claim 13, wherein the process is papermaking, the product is paper sheet, and the physical characteristic is the basis weight of the paper sheet.

19. A material processing system, wherein the material is transported from a first location to a second location, the system comprising:
- a material processing station, disposed at the first location, operable to affect a physical characteristic of the material;
- a sensor, disposed at the second location, operable to sense the affected physical characteristic and to produce a signal in response thereto;
- a material transport device, disposed between the first and second locations, operable to transport the material from the material processing station to the sensor;
- a signal generator, operable to generate a perturbation signal, operatively coupled to the material processing station to perturb the processing of the material by the station based upon the perturbation signal;
- a cross-correlator, operatively coupled to the sensor and to the signal generator, wherein the cross-correlator is operative to cross-correlate the perturbation signal and the sensor signal and to produce a cross-correlator, signal in response thereto; and
- a dead-time computer operatively coupled to the cross-correlator, wherein the computer is operative to determine, from the cross-correlation signal, the dead-time interval between the time when the processing station affects the physical characteristic of the material in response to the perturbation signal and the time when the sensor senses the effect of the perturbation signal on the material.

* * * * *